United States Patent
Cheng et al.

(10) Patent No.: US 9,618,681 B2
(45) Date of Patent: Apr. 11, 2017

(54) QUANTUM DOT BACKLIGHT MODULE AND DISPLAY DEVICE

(71) Applicant: SHENZHEN CHINA STAR OPTOELECTRONICS TECHNOLOGY CO., LTD., Guangdong (CN)

(72) Inventors: Yan Cheng, Guangdong (CN); Jiangfeng Wang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 106 days.

(21) Appl. No.: 14/416,190

(22) PCT Filed: Dec. 5, 2014

(86) PCT No.: PCT/CN2014/093149
§ 371 (c)(1),
(2) Date: Jan. 21, 2015

(87) PCT Pub. No.: WO2016/086416
PCT Pub. Date: Jun. 9, 2016

(65) Prior Publication Data
US 2016/0154162 A1    Jun. 2, 2016

(30) Foreign Application Priority Data
Dec. 1, 2014    (CN) .......................... 2014 1 0718721

(51) Int. Cl.
*F21V 8/00* (2006.01)
*F21V 9/16* (2006.01)

(52) U.S. Cl.
CPC ........... *G02B 6/0046* (2013.01); *G02B 6/005* (2013.01); *G02B 6/0043* (2013.01); *G02B 6/0073* (2013.01); *G02B 6/0058* (2013.01)

(58) Field of Classification Search
CPC .. G02B 6/0003; G02B 6/0043; G02B 6/0046; G02B 6/0051; G02B 6/0055; G02B 6/0073; G02B 6/005; G02B 6/0058
See application file for complete search history.

(56) References Cited

U.S. PATENT DOCUMENTS

| | | | |
|---|---|---|---|
| 6,710,366 B1 * | 3/2004 | Lee .......................... | B82Y 10/00 257/103 |
| 7,999,455 B2 * | 8/2011 | Davis .................... | C09K 11/565 313/503 |

(Continued)

FOREIGN PATENT DOCUMENTS

| CN | 202171162 U | 3/2012 |
|---|---|---|
| CN | 102628580 A | 8/2012 |

(Continued)

OTHER PUBLICATIONS

English abstract of 104344328.
(Continued)

*Primary Examiner* — Alan Cariaso
(74) *Attorney, Agent, or Firm* — WPAT, P.C.; Anthony King

(57) ABSTRACT

A quantum dot backlight module includes: a reflector, a light guide plate disposed above the reflector, a plurality of dot units disposed on an upper surface of the light guide plate at intervals, and a quantum dot packaged in each of the plurality of dot units, and light emitting diodes disposed on a edge side of the light guide plate. According to the present invention, the quantum dot material can be used less, which is good for reducing the production cost. Besides, heat can be effectively radiated from the light emitting diodes. Wide color gamut is realized as well.

16 Claims, 3 Drawing Sheets

(56) References Cited

U.S. PATENT DOCUMENTS

| | | | |
|---|---|---|---|
| 8,033,706 B1* | 10/2011 | Kelly | G02B 6/0036 362/307 |
| 8,459,855 B2 | 6/2013 | Anandan | |
| 8,740,438 B2* | 6/2014 | Hu | G02B 6/0023 362/231 |
| 9,134,475 B2* | 9/2015 | Watanabe | G02B 6/0043 |
| 2005/0243578 A1* | 11/2005 | Lee | G02B 6/0036 362/617 |
| 2007/0132918 A1* | 6/2007 | Pan | G02B 6/0046 349/96 |
| 2008/0024401 A1* | 1/2008 | DeGroot | G02B 5/04 345/81 |
| 2011/0128471 A1* | 6/2011 | Suckling | G02B 6/0041 349/62 |
| 2012/0140436 A1* | 6/2012 | Yang | F21V 13/02 362/84 |
| 2013/0021822 A1* | 1/2013 | Wimmer | G02B 6/005 362/612 |
| 2014/0036528 A1* | 2/2014 | Kim | G02B 6/26 362/606 |
| 2014/0158982 A1 | 6/2014 | Park et al. | |
| 2016/0137916 A1* | 5/2016 | Wachi | C09K 11/025 252/519.31 |

FOREIGN PATENT DOCUMENTS

| | | |
|---|---|---|
| CN | 102768433 A | 11/2012 |
| CN | 202521397 U | 11/2012 |
| CN | 103032765 A | 4/2013 |
| CN | 104075190 A | 10/2014 |
| CN | 104344328 A | 2/2015 |

OTHER PUBLICATIONS

English abstract of 202521397.
English abstract of 104075190.
English abstract of 202171162.
English abstract of 103032765.
English abstract of 102628580.
English abstract of 102768433.

* cited by examiner

QUANTUM DOT BACKLIGHT MODULE AND DISPLAY DEVICE

BACKGROUND OF THE INVENTION

1. Field of the Invention

The present invention relates to the technological field of displays, and more particularly, to a quantum dot (QD) backlight module and a display device.

2. Description of the Prior Art

Semiconductor QD fluorescent powder is a new kind of light white light emitting diode (LED) luminescent material. The semiconductor QD fluorescent powder is a kind of particle larger than $H_2O$ but smaller than viruses. The light emitted by a standard blue LED is transformed to different kinds of light with different wavelengths according to the size of the semiconductor QD fluorescent powder. A long wavelength (such as red light) emits according to a bigger semiconductor QD fluorescent powder. A short wavelength (such as green light) is transformed according to a smaller semiconductor QD fluorescent powder. The mixed particles of various sizes form a new spectrum. Owing to the feature of the QD, a quantum dot enhanced film (QDEF) is produced. The light source of the standard blue LED is used to realize the high quality white light with the three primary colors. The display quality of liquid crystal displays (LCDs) reaches to a new, high level. Compared with the conventional white LED fluorescent luminescent material, the QD fluorescent powder features broad absorption and narrow emission, higher luminous efficacy, longer service life, better color rendering properties, and purer color. So any device using the QD fluorescent luminescent material has wider color gamut and better display quality.

In the conventional technology, the QDEF is usually used in the backlight module. As FIG. 1 shows, the backlight module comprises a blue LED 10, a reflector 20, a light guide plate (LGP) 30 disposed above the reflector 20, a QD thin film 40 disposed above the LGP 30, and an optical film 50 disposed above the QD thin film 40. The blue LED 10 is disposed at the left side of the LGP 30. The QD thin film 40 transforms the blue light emitted by the blue LED 10 into red light and green light. Based on principles of energy conversion, a new, high level is transformed into a low level when no external energy intervenes. That's why the blue light emitted by the blue LED 10 is transformed into red light and green light. The three primary colors are shown on the display device. If the QD thin film 40 is disposed in the blue LED 10, heat radiation may be a problem for the light source of the blue LED 10. To solve this problem, the QD thin film 40 is presently disposed above the LGP 30. The problem of heat radiation is really settled. The wavelength of the blue light is also successfully transformed to the wavelength of the red light and the wavelength of the green light. However, the QD thin film 40 needs to be as big as the LCD panel. It is probably very hard to fully utilize the QD material. Moreover, the QD material is mostly the material with cadmium (Cd), which implies that the QD material is mostly poisoning. The packaging of the whole thin film in the process of production is a big problem because unsuccessful packaging results in dangerous and harmful Cd pollution. In addition, the QD material may become ineffective due to the influence of oxygen and water in the air.

Therefore, it is necessary to propose a new technical plan for solving the above-mentioned problem.

SUMMARY OF THE INVENTION

An object of the present invention is to provide a QD backlight module and a display device for solving some problems occurring in the conventional technology. The problems are that the QD material cannot be efficiently used because the QD film is disposed above the LGP, that unsuccessful packaging of the whole thin film in the process of production may result in dangerous and harmful Cd pollution, and that the QD material may become ineffective due to the influence of oxygen and water in the air.

According to the present invention, a QD backlight module comprises: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, semiconductor QD fluorescent powder put in the QD, and each of the plurality of dot units having a cylindrical structure;

the LGP comprising a first lateral side and a second lateral side, the first lateral side being opposite to the second lateral side, a thickness of the first lateral side of the LGP being larger than a thickness of the second lateral side of the LGP, and the first lateral side of the LGP being near a lateral side of the LED;

the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards.

In one aspect of the present invention, the plurality of dot units are set as $t/\tan \theta c$, $\theta c$ represents an incident angle generated after a light beam is totally reflected in the LGP, and t represents a thickness between the center of the bottom of adjacent dot units at the left side and the bottom of the LGP.

In another aspect of the present invention, the QD backlight module further comprises a diffuser disposed above the LGP.

In another aspect of the present invention, the QD backlight module further comprises an optical film disposed above the diffuser.

In another aspect of the present invention, the LED is a blue LED.

In another aspect of the present invention, the QD comprises a red QD and a green QD.

In another aspect of the present invention, a lateral surface of the dot unit having the cylindrical structure is made of reflective material.

In another aspect of the present invention, the red QD comprises a red QD with a bigger particle and a red QD with a smaller particle.

In still another aspect of the present invention, the green QD comprises a green QD with a bigger particle and a green QD with a smaller particle.

In yet another aspect of the present invention, the optical film is either a prism or a diffuser film.

According to the present invention, a QD backlight module comprises: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, and semiconductor QD fluorescent powder put in the QD;

the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards.

In one aspect of the present invention, each of the plurality of dot units is a cylindrical structure.

In another aspect of the present invention, the LGP comprises a first lateral side and a second lateral side, the first lateral side is opposite to the second lateral side, a thickness of the first lateral side of the LGP is larger than a thickness of the second lateral side of the LGP, and the first lateral side of the LGP is near a lateral side of the LED.

In another aspect of the present invention, the plurality of dot units are set as t/tan θc, θc represents an incident angle generated after a light beam is totally reflected in the LGP, and t represents a thickness between the center of the bottom of adjacent dot units at the left side and the bottom of the LGP.

In another aspect of the present invention, the QD backlight module further comprises a diffuser disposed above the LGP.

In another aspect of the present invention, the QD backlight module further comprises an optical film disposed above the diffuser.

In another aspect of the present invention, the LED is a blue LED.

In still another aspect of the present invention, the QD comprises a red QD and a green QD.

In yet another aspect of the present invention, a lateral surface of the dot unit having the cylindrical structure is made of reflective material.

According to the present invention, a display device comprises a display panel and a quantum dot (QD) backlight module disposed opposite to the display panel, the QD backlight module comprising: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, and semiconductor QD fluorescent powder put in the QD;

the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards.

In contrast to prior art, the plurality of dot units where the QDs are packaged are disposed on the upper surface of the LGP. The light emitted by the backlight source of the LED passes through the LGP and the plurality of dot units. The light is transformed by the QDs into light with diverse wavelengths and emitted outwards. The QD backlight module designed by the present invention effectively enhances utilization of the QD material. The plurality of dot units where QDs are packaged are arranged with a set distance so it is not necessary to use a whole sheet of QD film. In other words, the QD material can be used less, which is good for reducing the production cost. Besides, heat can be effectively radiated from the LED. Wide color gamut is realized as well.

These and other features, aspects and advantages of the present disclosure will become understood with reference to the following description, appended claims and accompanying figures.

DETAILED DESCRIPTION OF THE PREFERRED EMBODIMENTS

The following descriptions for the respective embodiments are specific embodiments capable of being implemented for illustrations of the present invention, and should not be construed as limiting the other specific embodiments of the present invention which are not described herein. The terms "a" or "an", as used herein, are defined as one or more than one.

The display panel of the present invention may be a Thin Film Transistor Liquid Crystal Display (TFT-LCD) or an Active Matrix Organic Light Emitting Diode (AMOLED) panel.

According to the following preferred embodiment of the present invention, the plurality of dot units where the QDs are packaged are disposed on the upper surface of the LGP. The light emitted by the backlight source of the LED passes through the LGP and the plurality of dot units. The light is transformed by the QDs into light with diverse wavelengths and emitted outwards. The QD backlight module designed by the present invention effectively enhances utilization of the QD material. The plurality of dot units where QDs are packaged are arranged with a set distance so it is not necessary to use a whole sheet of QD film. In other words, the QD material can be used less, which is good for reducing the production cost. Besides, heat can be effectively radiated from the LED. Wide color gamut is realized as well. The problems occurring in the conventional technology that the QD film disposed above the LGP makes it very hard to utilize the QG material effectively, that unsuccessful packaging of the whole thin film in the process of production may result in dangerous and harmful Cd pollution, and that the QD material may become ineffective due to the influence of oxygen and water in the air are all settled in the present invention.

This embodiment provides a clear and concise overview of the technological plan of the present invention.

Figure 1:
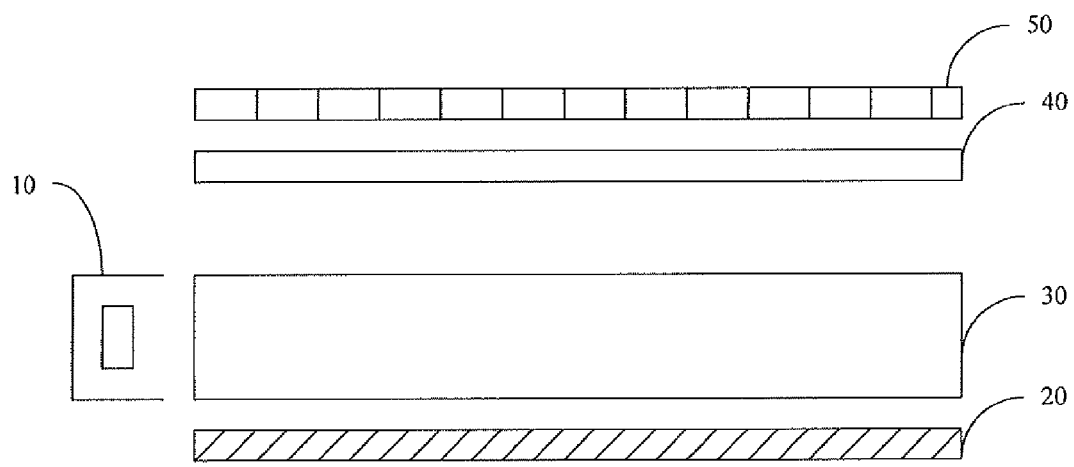
FIG. 1 shows a schematic diagram of a conventional backlight module.
Figure 2:
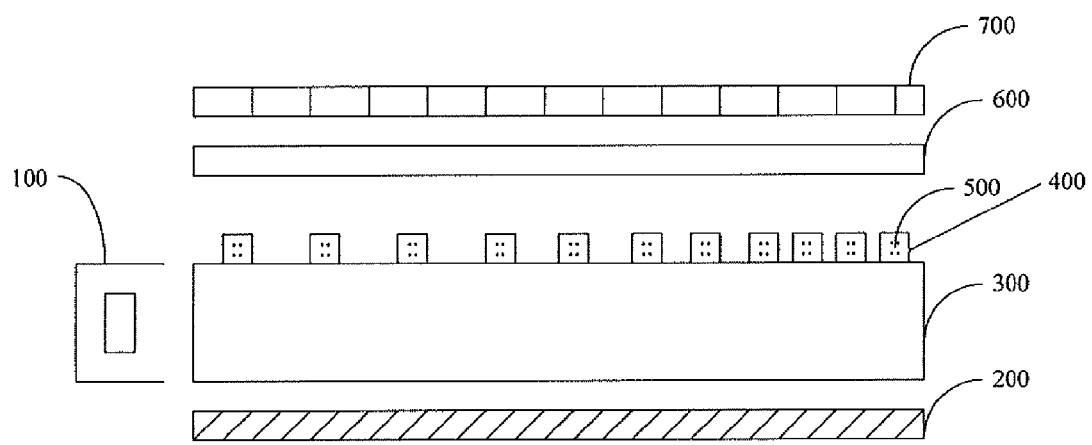
FIG. 2 shows a schematic diagram of the structure of a QD backlight module according to a preferred embodiment of the present invention.

Please refer to FIG. 2 showing a schematic diagram of the structure of a QD backlight module according to a preferred embodiment of the present invention. Components relevant to the preferred embodiment of the present invention are shown in FIG. 2 for better understanding.

The QD backlight module mainly comprises an LED 100, a reflector 200, an LGP 300, a plurality of dot units 400, and QDs 500. The LGP 300 is disposed above the reflector 200. The plurality of dot units 400 are disposed on an upper surface of the LGP 300 at intervals. The QDs 500 are packaged in each of the plurality of dot units 400. The LED 100 is disposed on a lateral side of the LGP 300. Semiconductor QD fluorescent powder is put in the QDs 500.

In this embodiment of the present invention, the LED 100 supplies the LGP 300 with light. Light emitted by a backlight source of the LED 100 passes through the LGP 300, the plurality of dot units 400, and the QDs 500 subsequently.

The QDs 500 transform the light emitted by the backlight source of the LED 100 to different waveforms. The light emitted by the backlight source of the LED 100 with different waveforms is emitted outwards. The 200 reflects the light emitted from the bottom back to the LGP 300 for improving utility effect of the light. The plurality of dot units 400 effectively gather the light emitted by the backlight source to a point light source for the QDs 500 to show images. In this way, the QD material is effectively used. In this embodiment, the QDs 500 is packaged in each of the plurality of dot units 400 rather than being disposed in the LED 100 so it is unnecessary to worry about heat radiation of the LED 100.

Figure 3:
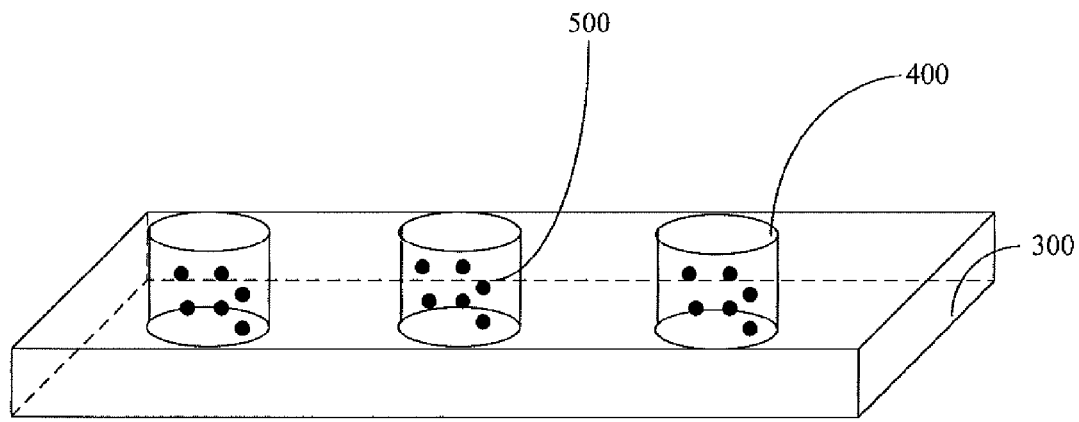
FIG. 3 shows a schematic diagram of a light guide plate according to a preferred embodiment of the present invention.

In another preferable embodiment, a dot unit 400 has a columnar structure. Preferably, the dot unit 400 has a cylindrical structure, as shown in FIG. 3. But it is understood that the dot unit 400 may have a polygonal columnar structure. Any modifications, any equivalent replacements, or any improvements within the spirit and principles of the present invention should be included within the scope of the present invention. In this embodiment, the lateral surface of the dot unit 400 having the cylindrical structure is made of reflective material. The upper surface of the dot unit 400 is made of silicone or polymethyl methacrylate (PMMA) for packaging the QDs 500. Light mostly concentrates on the upper surface of the dot unit 400 having the cylindrical structure and shines outwards from the upper surface of the dot unit 400 after being retrieved from the LGP 300 and undergoing multiple reflections. The design of the cylindrical shape of the dot unit 400 is good for concentrating the light on the QDs 500 and improving the efficiency of the QDs 500. In addition, the design of the cylindrical shape of the dot unit 400 is good for packaging the QDs 500. Because the QDs 500 is packaged in the cylindrical dot unit 400, the QDs 500 will not be influenced by oxygen and water. In other words, the QDs 500 maintain effective.

Figure 4:
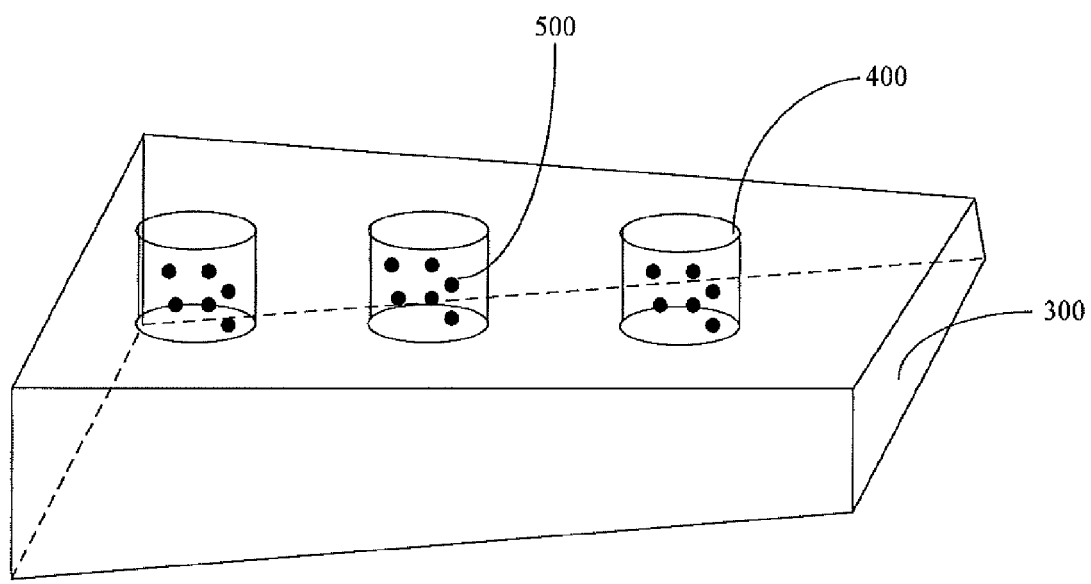
FIG. 4 shows a top view of a light guide plate according to a preferred embodiment of the present invention.
Figure 5:
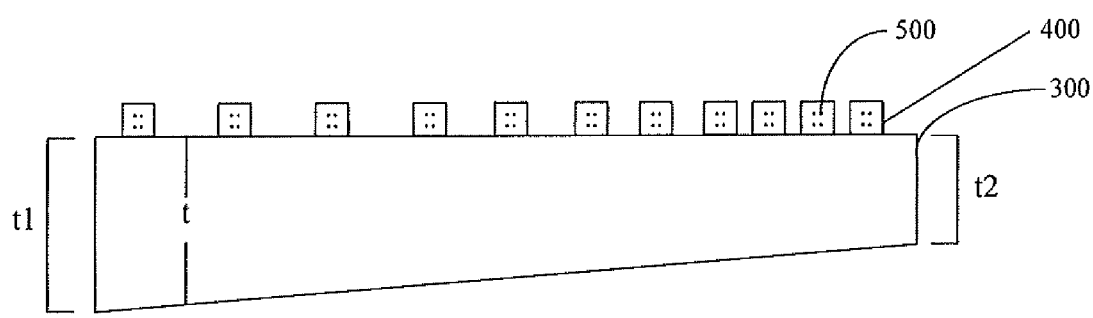
FIG. 5 shows a cross-sectional view of a light guide plate according to a preferred embodiment of the present invention.

According to another embodiment of the present invention, an LGP 300 comprises a first lateral side and a second lateral side as shown in FIG. 4 and FIG. 5. The first lateral side is opposite to the second lateral side. The thickness of the first lateral side is larger than the thickness of the second lateral side. The first lateral side of the LGP 300 is near a lateral side of the LED 100. For example, the lateral side of the LGP 300 near the LED 100 is set as t1, and the other lateral side of the LGP 300 is set as t2. To simplify the process of packaging a plurality of dot units 400, the LGP 300 is an LGP having the equally distributed dot units 400 and a wedge-shaped structure. Further, the distance among the plurality of dot units 400 is set as $t/\tan \theta c$ where $\theta c$ represents a critical angle (an incident angle generated after a light beam is totally reflected in the LGP 300), and t represents the thickness between the center of the bottom of adjacent dot units 400 at the left side and the bottom of the LGP 300. The red and green QDs 500 are mixed and packaged in each of the plurality of cylindrical dot units 400. Light shines on an optical film above after being retrieved from the QDs 500 from each of the plurality of cylindrical dot units 400.

In this embodiment of the present invention, the blue LED is preferably used as the LED 100. LEDs with other colors can also be used as the LED 100. The QDs 500 can transform the light emitted by the standard blue LED into light with different wavelengths. The QDs 500 with larger particles emit a long wavelength (such as red light). The QDs 500 with smaller particles are transformed to be a short wavelength (such as green light). The QDs 500 with mixed particles of various sizes form a new spectrum. The standard blue LED ensures the high quality white light with the three primary colors and improves the display performance of LCDs to a new, high high level. This is the reason why the blue LED is preferably adopted in this embodiment.

In this embodiment of the present invention, the QDs 500 comprise red QDs and green QDs. The red QDs further comprise red QDs with bigger particles and red QDs with smaller particles. The green QDs further comprise green QDs with bigger particles and green QDs with smaller particles. In this embodiment, a plurality of red QDs with bigger and smaller particles and a plurality of green QDs with bigger and smaller particles are packaged in each of the plurality of dot units 400. In this way, the QDs 500 can transform the light emitted by the light source of the standard blue LED into light with different wavelengths. The QDs 500 with bigger particles emits a long wavelength (such as red light). The QDs 500 with smaller particles are transformed to be a short wavelength (such as green light). The QDs 500 with mixed particles of various sizes form a new spectrum.

According to another preferred embodiment of the present invention, a QD backlight module further comprises a diffuser 600. The diffuser 600 is disposed above an LGP 300. The diffuser 600 promotes light emitted by a backlight source to be distributed and spread evenly and enhances transmittance of light for high brightness.

According to another preferred embodiment of the present invention, a QD backlight module further comprises an optical film 700. The optical film 700 is disposed above a diffuser 600. The optical film 700 may be a prism or a diffuser film. The optical film 700 promotes the optical performance of the QD backlight module.

The QD backlight module is an edge-lit backlight module. The QD backlight module supplies the display device with a backlight source.

This embodiment further comprises a display device. The display device comprises a display panel and a QD backlight module. The display panel is disposed opposite the QD backlight module. The display panel may be a thin film transistor liquid crystal display (TFT-LCD) or an active matrix organic light emitting diode (AMOLED). The display panel is formed by two transparent substrates and liquid crystals inserted in an area between the transparent substrates. The display panel comprises a plurality of pixels for showing images.

The following paragraphs introduce a structure of the QD backlight module used in the display device.

Please refer to FIG. 2 showing a schematic diagram of the structure of a QD backlight module according to a preferred embodiment of the present invention. Components relevant to the preferred embodiment of the present invention are shown in FIG. 2 for better understanding.

The QD backlight module mainly comprises an LED 100, a reflector 200, an LGP 300, a plurality of dot units 400, and QDs 500. The LGP 300 is disposed above the reflector 200. The plurality of dot units 400 are disposed on an upper surface of the LGP 300 at intervals. The QDs 500 are packaged in each of the plurality of dot units 400. The LED 100 is disposed on a lateral side of the LGP 300. Semiconductor QD fluorescent powder is put in the QDs 500.

In this embodiment of the present invention, the LED 100 supplies the LGP 300 with light. Light emitted by a backlight source of the LED 100 passes through the LGP 300, the plurality of dot units 400, and the QDs 500 subsequently. The QDs 500 transform the light emitted by the backlight source of the LED 100 to different waveforms. The light emitted by the backlight source of the LED 100 with different waveforms is emitted outwards. The 200 reflects the light emitted from the bottom back to the LGP 300 for improving utility effect of the light. The plurality of dot units 400 effectively gather the light emitted by the backlight source to a point light source for the QDs 500 to show images. In this way, the QD material is effectively used. In this embodiment, the QDs 500 is packaged in each of the plurality of dot units 400 rather than being disposed in the LED 100 so it is unnecessary to worry about heat radiation of the LED 100.

In another preferable embodiment, a dot unit 400 has a columnar structure. Preferably, the dot unit 400 has a cylindrical structure, as shown in FIG. 3. But it is understood that the dot unit 400 may have a polygonal columnar structure. Any modifications, any equivalent replacements, or any improvements within the spirit and principles of the present invention should be included within the scope of the present invention. In this embodiment, the lateral surface of the dot unit 400 having the cylindrical structure is made of reflective material. The upper surface of the dot unit 400 is made of silicone or polymethyl methacrylate (PMMA) for packaging the QDs 500. Light mostly concentrates on the upper surface of the dot unit 400 having the cylindrical structure and shines outwards from the upper surface of the dot unit 400 after being retrieved from the LGP 300 and undergoing multiple reflections. The design of the cylindrical shape of the dot unit 400 is good for concentrating the light on the QDs 500 and improving the efficiency of the QDs 500. In addition, the design of the cylindrical shape of the dot unit 400 is good for packaging the QDs 500. Because the QDs 500 is packaged in the cylindrical dot unit 400, the QDs 500 will not be influenced by oxygen and water. In other words, the QDs 500 maintain effective.

According to another embodiment of the present invention, an LGP 300 comprises a first lateral side and a second lateral side as shown in FIG. 4 and FIG. 5. The first lateral side is opposite to the second lateral side. The thickness of the first lateral side is larger than the thickness of the second lateral side. The first lateral side of the LGP 300 is near a lateral side of the LED 100. For example, the lateral side of the LGP 300 near the LED 100 is set as t1, and the other lateral side of the LGP 300 is set as t2. To simplify the process of packaging a plurality of dot units 400, the LGP 300 is an LGP having the equally distributed dot units 400 and a wedge-shaped structure. Further, the distance among the plurality of dot units 400 is set as t/tan θc where θc represents a critical angle (an incident angle generated after a light beam is totally reflected in the LGP 300), and t represents the thickness between the center of the bottom of adjacent dot units 400 at the left side and the bottom of the LGP 300. The red and green QDs 500 are mixed and packaged in each of the plurality of cylindrical dot units 400. Light shines on an optical film above after being retrieved from the QDs 500 from each of the plurality of cylindrical dot units 400.

In this embodiment of the present invention, the blue LED is preferably used as the LED 100. LEDs with other colors can also be used as the LED 100. The QDs 500 can transform the light emitted by the standard blue LED into light with different wavelengths. The QDs 500 with larger particles emit a long wavelength (such as red light). The QDs 500 with smaller particles are transformed to be a short wavelength (such as green light). The QDs 500 with mixed particles of various sizes form a new spectrum. The standard blue LED ensures the high quality white light with the three primary colors and improves the display performance of LCDs to a new, high high level. This is the reason why the blue LED is preferably adopted in this embodiment.

In this embodiment of the present invention, the QDs 500 comprise red QDs and green QDs. The red QDs further comprise red QDs with bigger particles and red QDs with smaller particles. The green QDs further comprise green QDs with bigger particles and green QDs with smaller particles. In this embodiment, a plurality of red QDs with bigger and smaller particles and a plurality of green QDs with bigger and smaller particles are packaged in each of the plurality of dot units 400. In this way, the QDs 500 can transform the light emitted by the light source of the standard blue LED into light with different wavelengths. The QDs 500 with bigger particles emits a long wavelength (such as red light). The QDs 500 with smaller particles are transformed to be a short wavelength (such as green light). The QDs 500 with mixed particles of various sizes form a new spectrum.

According to another preferred embodiment of the present invention, a QD backlight module further comprises a diffuser 600. The diffuser 600 is disposed above an LGP 300. The diffuser 600 promotes light emitted by a backlight source to be distributed and spread evenly and enhances transmittance of light for high brightness.

According to another preferred embodiment of the present invention, a QD backlight module further comprises an optical film 700. The optical film 700 is disposed above a diffuser 600. The optical film 700 may be a prism or a diffuser film. The optical film 700 promotes the optical performance of the QD backlight module.

The QD backlight module is an edge-lit backlight module. The QD backlight module supplies the display device with a backlight source.

The display device may be any product or component with a function of display such as a cellphone, a flat computer, a television (TV) set, a display device, a notebook computer, a digital photo frame, or a global positioning system (GPS).

To sum up, the plurality of dot units where the QDs are packaged are disposed on the upper surface of the LGP. The light emitted by the backlight source of the LED passes through the LGP and the plurality of dot units. The light is transformed by the QDs into light with diverse wavelengths and emitted outwards. The QD backlight module designed by the present invention effectively enhances utilization of the QD material. The plurality of dot units where QDs are packaged are arranged with a set distance so it is not necessary to use a whole sheet of QD film. In other words, the QD material can be used less, which is good for reducing the production cost. Besides, heat can be effectively radiated from the LED. Wide color gamut is realized as well. The problems occurring in the conventional technology that the QD film disposed above the LGP makes it very hard to utilize the QG material effectively, that unsuccessful packaging of the whole thin film in the process of production may result in dangerous and harmful Cd pollution, and that the QD material may become ineffective due to the influence of oxygen and water in the air are all settled in the present invention.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In particular, regarding the various functions performed by the above described components, the terms used to describe such components (i.e. elements, resources, etc.) are intended to correspond (unless otherwise indicated) to any component, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description or in the claims, such terms are intended to be inclusive in a manner similar to the term "comprising".

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, rather than the foregoing description and the exemplary embodiments described therein.

What is claimed is:

1. A quantum dot (QD) backlight module, comprising: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, semiconductor QD fluorescent powder put in the QD, and each of the plurality of dot units having a cylindrical structure;
    the LGP comprising a first lateral side and a second lateral side, the first lateral side being opposite to the second lateral side, a thickness of the first lateral side of the LGP being larger than a thickness of the second lateral side of the LGP, and the first lateral side of the LGP being near a lateral side of the LED;
    the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards,
    wherein a lateral surface of the dot unit having the cylindrical structure is made of reflective material.

2. The QD backlight module as claimed in claim 1, wherein the plurality of dot units are set as t/tan θc, θc represents an incident angle generated after a light beam is totally reflected in the LGP, and t represents a thickness between the center of the bottom of adjacent dot units at the left side and the bottom of the LGP.

3. The QD backlight module as claimed in claim 1, wherein the QD backlight module further comprises a diffuser disposed above the LGP.

4. The QD backlight module as claimed in claim 3, wherein the QD backlight module further comprises an optical film disposed above the diffuser.

5. The QD backlight module as claimed in claim 4, wherein the optical film is either a prism or a diffuser film.

6. The QD backlight module as claimed in claim 1, wherein the LED is a blue LED.

7. The QD backlight module as claimed in claim 1, wherein the QD comprises a red QD and a green QD.

8. The QD backlight module as claimed in claim 7, wherein the red QD comprises a red QD with a bigger particle and a red QD with a smaller particle.

9. The QD backlight module as claimed in claim 7, wherein the green QD comprises a green QD with a bigger particle and a green QD with a smaller particle.

10. A quantum dot (QD) backlight module, comprising: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, and semiconductor QD fluorescent powder put in the QD;
    the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards,
    wherein the LGP comprises a first lateral side and a second lateral side, the first lateral side is opposite to the second lateral side, a thickness of the first lateral side of the LGP is larger than a thickness of the second lateral side of the LGP, and the first lateral side of the LGP is near a lateral side of the LED,
    wherein each of the plurality of dot units is a cylindrical structure, and a lateral surface of the dot unit having the cylindrical structure is made of reflective material.

11. The QD backlight module as claimed in claim 10, wherein the plurality of dot units are set as t/tan θc, θc represents an incident angle generated after a light beam is totally reflected in the LGP, and t represents a thickness between the center of the bottom of adjacent dot units at the left side and the bottom of the LGP.

12. The QD backlight module as claimed in claim 10, wherein the QD backlight module further comprises a diffuser disposed above the LGP.

13. The QD backlight module as claimed in claim 12, wherein the QD backlight module further comprises an optical film disposed above the diffuser.

14. The QD backlight module as claimed in claim 10, wherein the LED is a blue LED.

15. The QD backlight module as claimed in claim 10, wherein the QD comprises a red QD and a green QD.

16. A display device comprising a display panel and a quantum dot (QD) backlight module disposed opposite to the display panel, the QD backlight module comprising: a light emitting diode (LED), a reflector, a light guide plate (LGP), a plurality of dot units, and a QD, the LGP disposed above the reflector, the plurality of dot units disposed on an upper surface of the LGP at intervals, the QD packaged in each of the plurality of dot units, the LED disposed on a lateral side of the LGP, and semiconductor QD fluorescent powder put in the QD;
    the LED emitting light to the LGP, a light emitted by a backlight source of the LED passing through the LGP, the plurality of dot units, and the QD subsequently, the QD transforming the light emitted by the backlight source of the LED to light with diverse waveforms, and the light with the diverse waveforms being emitted outwards, wherein the LGP comprises a first lateral side and a second lateral side, the first lateral side is opposite to the second lateral side, a thickness of the first lateral side of the LGP is larger than a thickness of the second lateral side of the LGP, and the first lateral side of the LGP is near a lateral side of the LED, wherein a lateral surface of the dot unit having a cylindrical structure is made of reflective material.

* * * * *